Dec. 26, 1950     F. BURCHELL     2,535,781
CHANGEABLE IMAGE AND COLOR DISPLAY DEVICE
Filed April 12, 1946     2 Sheets—Sheet 1
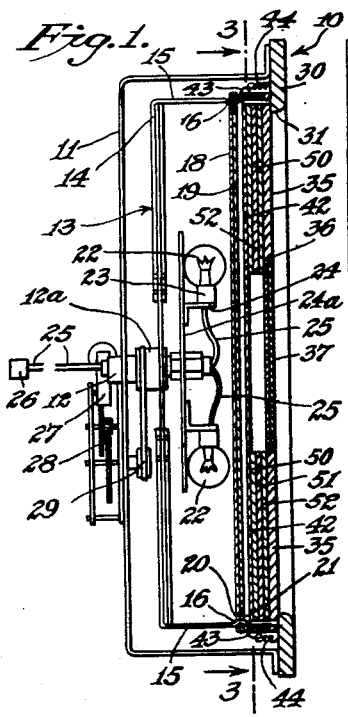
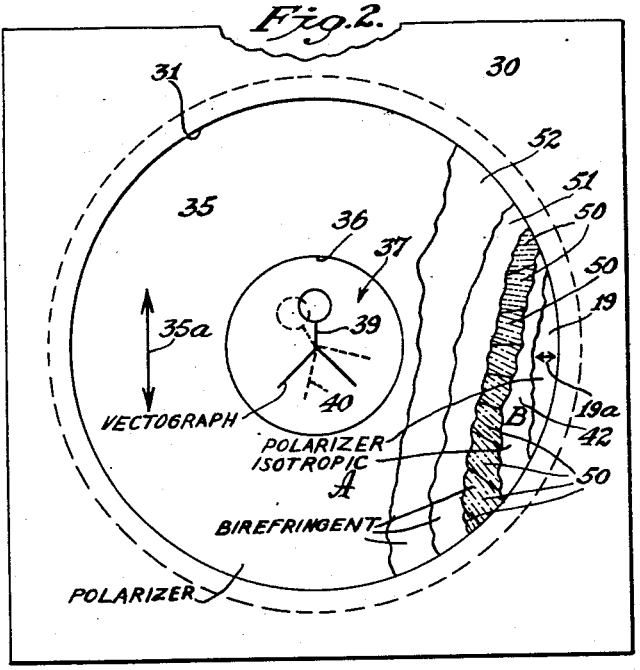
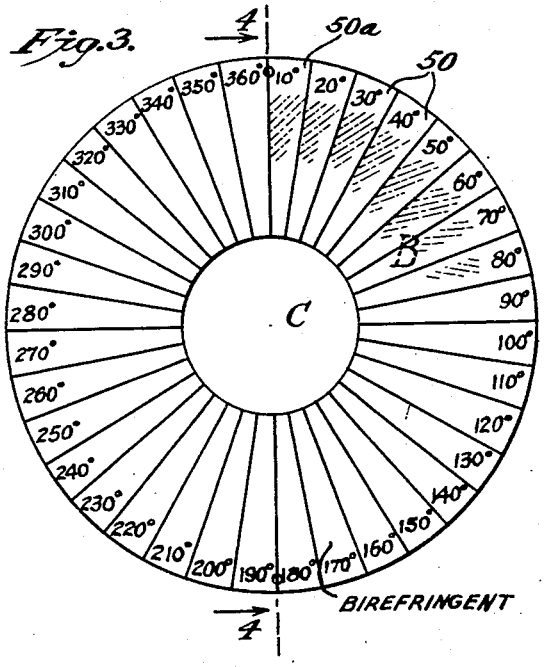
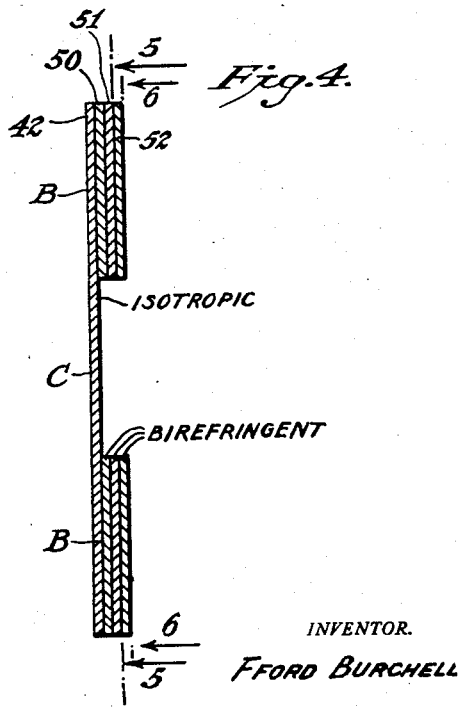
INVENTOR.
FFORD BURCHELL
BY Kenyon & Kenyon
ATTORNEYS

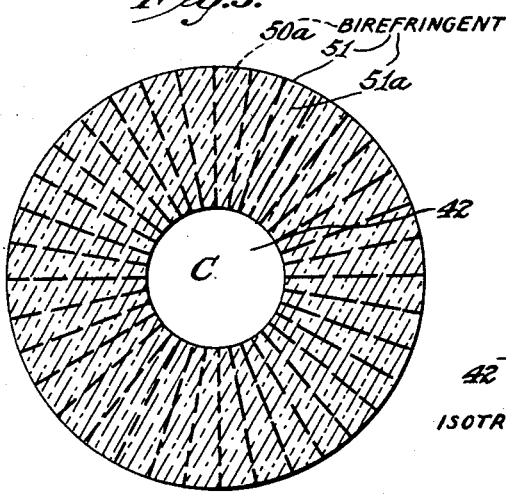
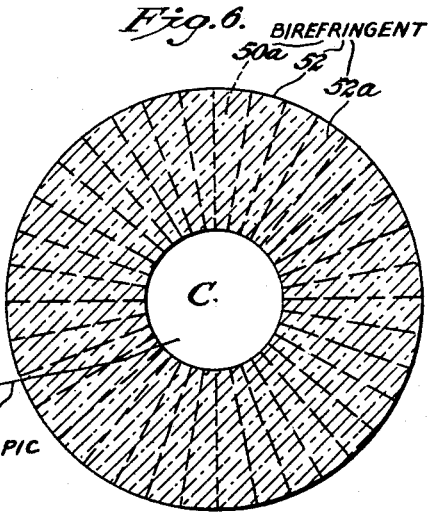
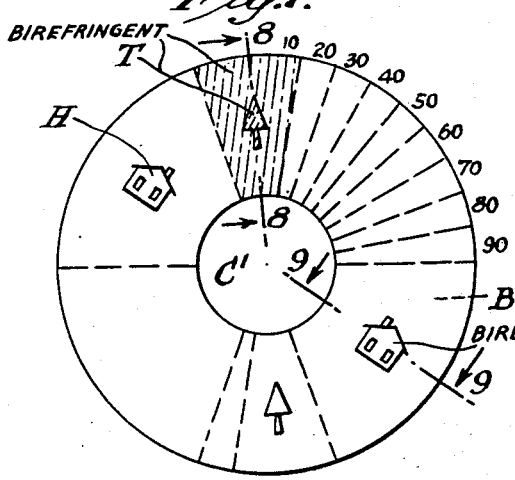
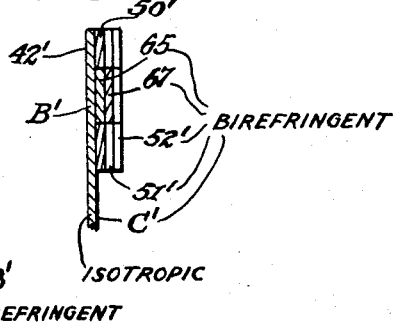
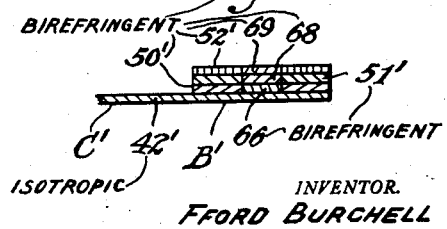
INVENTOR.
FFORD BURCHELL

Patented Dec. 26, 1950

2,535,781

UNITED STATES PATENT OFFICE 2,535,781

CHANGEABLE IMAGE AND COLOR DISPLAY DEVICE

Fford Burchell, New York, N. Y., assignor to Burchell-Holloway Corporation, New York, N. Y., a corporation of New York Application April 12, 1946, Serial No. 661,532

1 Claim. (Cl. 40—130)

This invention relates to display devices utilizing polarized light and its effects, and particularly to devices of such type wherein changeable images and colors are visible to the observer.

An object of this invention is to provide a display device of this character wherein it will be possible for an observer to see different images in turn by changing polarized light played upon the images, and at the same time with the same light to provide novel decorative color changes and seeming color flow in areas surrounding such images as well as in designs, if any, located in such areas.

Yet another object of this invention is to provide novel structure for use in such a device embodying the use of polarizing materials, birefringent materials and composite photographs known as vectographs which consist generally of two images or pictures one on top of the other, exposed and developed in such a way that the images are polarized at right angles to each other.

Another object of the invention is to provide a device having elements of mystery and aesthetic appeal because the observer will see, for example, one image melt or change into another for no apparent reason while at the same time in the areas surrounding such images color changes will appear accompanied by optical illusions of motion, and any designs in such areas at the same time, likewise, will undergo variegated color transformations accompanied by various mystifying optical illusions.

Still another object of the invention is to provide devices of this character which may be manufactured readily, simply and in quantity at comparatively low cost.

To the accomplishment of the foregoing and such other objects as may hereinafter appear, this invention consists in the novel construction and arrangement of parts hereinafter to be described in detail and then sought to be defined in the appended claims, reference being had to the accompanying drawings forming a part hereof which show, merely for the purposes of illustrative disclosure, several embodiments of the invention, it being expressly understood, however, that changes may be made in practice within the scope of the claims without digressing from the inventive idea.

In the drawing in which similar reference characters denote corresponding parts:

Fig. 1 is a vertical sectional elevation of a display device embodying features of the invention;

Fig. 2 is a front elevation of the device of Fig. 1 partially broken away to illustrate details of construction;

Fig. 3 is a partial vertical section taken along line 3—3 of Fig. 1 and viewed in the direction of the arrows;

Fig. 4 is a vertical section taken along line 4—4 of Fig. 3 and viewed in the direction of the arrows;

Fig. 5 is a section taken along line 5—5 of Fig. 4, also viewed in the direction of the arrows;

Fig. 6 is a section taken along line 6—6 of Fig. 4, and viewed in the direction of the arrows;

Fig. 7 is an elevational view of a modified form of construction;

Fig. 8 is a section taken along line 8—8 of Fig. 7 and viewed in the direction of the arrows; and Fig. 9 is a section taken along line 9—9 of Fig. 8 and also viewed in the direction of the arrows.

Referring to the drawing, 10 denotes generally a machine made, for example, in accord with my U. S. Letters Patent No. 2,261,957 granted November 11, 1941, that may be used in conjuction with devices constituting the subject-matter of this invention for carrying out the objects thereof. This machine 10 embodies generally a frame 11. This frame 11 supports a fixed hollow shaft 12. A rotatable collar 12a is mounted on this shaft and a cage-like frame 13 is carried by the collar 12a. This cage-like frame 13 is constructed of wire elements 14 extending radially of the collar 12a. These elements 14 have arm portions 15 that all extend in the same direction and in parallelism with the shaft 12. The portions 15 terminate in hook-like suspenders 16. A sheet 18 of translucent isotropic material is provided together with a co-extensive sheet 19 of polarized material such as "Polaroid" which has a fixed polarizing axis denoted by the arrows 19a. The sheets 18 and 19 which may be united or laminated together in any suitable way, if desired, have perforations 20, 21 adjacent their peripheries so that they can be attached to the hook-like suspenders 16. The arm portions 15 are spring-like in nature and tend to spread apart so that the mounting of said sheets 18 and 19 on the suspenders 16 has the effect of maintaining them yieldably taut and substantially flat plane and parallel surfaces.

A light source consisting of one or more electric lights 22 is positioned within the cage-like frame 13 and behind the sheets 18 and 19. In the embodiment shown, the sockets 23 for the lights are carried on brackets 24 attached to a plate member 24a fixed to the hollow shaft 12. The electric wiring 25 from these sockets is extended through the shaft 12 for connection in desirable manner with an electric power source 26.

The shaft 12 is driven by a suitable electric motor 27 coupled thereto as described, for example, in my said Patent No. 2,261,957, by suitable gearing 28 and belt drive 29.

The polarizing sheet or screen 19 has a fixed polarizing axis denoted by the arrows 19a so that when it is rotated in its plane in front of bulbs 23 the plane of polarization of the light from these bulbs 23 is constantly changing direction; in other words, variable polarized light reaches an observer in front of screen 19.

The frame 11 of the machine is attached, for example, to a face plate 30. The latter has a large opening 31 whose center is aligned with the axis of shaft 12.

An analyzer sheet 35 of polarizing material such as "Polaroid" is provided. This analyzer sheet 35 has a fixed polarizing axis denoted by the arrows 35a and has substantially the same dimensions as sheets 18 and 19. A portion of this analyzer sheet 35 is cut out leaving the aperture 36 which may be circular as shown, or have any other desired form such as square, rectangular, triangular or the like. A composite vectograph 37 is inserted into the aperture and secured thereto as by cementing around the edges or in any other suitable way. This vectograph 37 consists of a sheet of film bearing two pictures or images 39, 40 in layers, one on top of the other, exposed and developed in such a way that the images 39, 40 are polarized at right angles to each other. One or more apertures 36 may be provided in the sheet 35 and a vectograph picture 37 is positioned in each such aperture 36.

In a known use of such vectographs, if they are viewed through polarized spectacles, three dimensional pictures are seen by the spectator. In my invention these images are exposed to polarized light of changing polarity so that the two images of each vectograph alternately appear and disappear as will be presently described.

A sheet 42 of isotropic, translucent material such as matte cellulose acetate of substantially the same dimensions as sheets 18, 19 and 35 is also provided. This sheet together with analyzer sheet 35 are adapted to be positioned on the face plate 30 to cover the opening 31 with the isotropic sheet 42 lying between the outermost or stationary analyzer sheet 35 and the innermost or rotatable polarizing sheet 19. The analyzer sheet 35 and the isotropic sheet 42 may be suspended suitably as described in my said Patent No. 2,261,957 by appropriately located hooks 43 and springs 44 which are attached to the face plate 30 or in other suitable ways. When so suspended, all the sheets 18, 19, 35 and 42 are axially aligned for purposes to be presently described.

In those areas B of the isotropic sheet 42 other than the portions C coextensive with and aligned with the areas of the vectograph bearing aperture or apertures 36 of the sheet 35, suitable designs may be built up of layers of birefringent material in the manner described in Burchell et al. U. S. Patent No. 2,393,968, granted February 5, 1946. For example, if it is desired to secure the optical effect of color flow in a rotary direction in the annular area A about a centrally located vectograph picture 37, the corresponding annular area B of the isotropic sheet 42 has applied to it a series of segments 50 of birefringent material whose optical orientation or significant directions or axes are successively greater angles than some predetermined direction, say, the vertical. Thus in Fig. 3 the optical orientation or significant axis of the first segment 50a in the first quadrant and to the right of the vertical coordinate is, for example 10°, while for each successive segment in the clockwise direction to the last segment in the fourth quadrant adjacent to the first segment 50a has an optical orientation or significant axis 10° larger than the next preceding segment. In other words, the optical orientation of the successive segments proceeds in 10 degree steps through 360°. The angular increment of 10° may be varied and such change in increment affects the speed of color flow, smaller angular increments resulting in slower speeds than larger angular increments.

A birefringent material useful for making these segments consists of cellulose "Scotch tape Cellophane." In such tape the two rays in the Cellophane arising from a normally incident beam are substantially parallel and perpendicular to the edge of the mill roll of the Cellophane as originally produced. The significant direction of such "Cellophane" or birefringent material as applied thereto herein, refers to the projection onto the surface of the said material of the direction of vibration of the light in that one of the two beams in which the light is propagated more rapidly than in the other. Each segment 50, therefore, is readily oriented by laying a protractor down so that its flat side makes the desired angle of orientation with the vertical and cutting a 10 degree segment from it with one edge of the tape constituting one of the legs of the segment and applying the so cut segments successively to the glossy side of the isotropic sheet 42 in radially adjacent portions of the annular area B thereof so that the successive segments preferably have an edge in common.

An annular ring 51 of birefringent material, preferably also of cellulose "Scotch tape Cellophane" cut from a sheet of such material is then superimposed upon the layer of segments 50. This ring which has a single constant significant direction or axis throughout as indicated by the dot-dash lines 51a is so applied over the first layer of segments 50 that its significant direction or axis preferably is at an angle other than 45° with the vertical being more or less than such angle.

A second annular ring 52 of birefringent material preferably also of cellulose "Scotch tape Cellophane" cut from a sheet of such material is then superimposed upon the first annular ring 51. The ring 52 which also has a single constant significant direction or axis throughout as indicated by the dot-dash lines 52a is so applied over the first ring 51 that its significant direction, preferably, is at an angle of 45° with the horizontal or at any other desired angle. Both rings 51 and 52 are coextensive in area with areas A and B.

The isotropic sheet 42 bearing the so applied birefringent elements 50 and rings 51 and 52 may then be laminated or combined with the vectograph bearing polaroid sheet 35 in suitable manner as by use of transparent "Vinylite" cement, transparent cellulose acetate cement or other isotropic transparent cement. When such combination is made the elements 50 and rings 51 and 52 lie between the isotropic sheet 42 and the vectograph bearing polaroid analyzer sheet 35 and only in those areas B and A of the latter two sheets other than that which is coextensive with the vectograph 37, or vectographs 37 if more than one has been applied in the sheet 35. The area or areas C of sheet 42 which are coextensive with that of the aperture or apertures 36 is entirely free of any birefringent material. In fact, it or they may be apertures corresponding in size and number to the apertures in sheet 35.

The composite screen or assembly so formed is then ready for use and is suspended on the hooks and springs 43, 44 with the polarizer sheet 35 outermost. The sheets 42 and 35 may be kept separated if desired but sheet 35 must always lie outermost.

When the lights 22 are turned on and the cage-like frame 13 is rotated by the motor 27, the innermost polarizing sheet 19 rotates in its plane. As a result, to an observer stationed in front of the outer analyzer sheet 35, if the sheet 19 is rotated clockwise, the images 39, and 40 alternately will appear and disappear with a gradual fading in of one and fading out of the other. At the same time a counterclockwise rotation of color changes will be observed in the annular polaroid analyzing area A of sheet 35 surrounding the vectograph 37, the latter being caused by the effects of changing polarized light transmitted through sheet 19 upon the layers 50, 51, 52 of birefringent material underlying this analyzing area A.

Any of the birefringent designs of the aforesaid Patent 2,393,968 may be applied to an isotropic sheet 42' in its annular area B' either alone or in conjunction with the color flow arrangement just described. In Figs. 7–9 inclusive such an arrangement is indicated somewhat schematically. Therein, designs consisting of, for example, a tree T and a house H are combined with the described color flow arrangement. To this end, segments 50' in area B' may be cut away in portions thereof to receive the undermost birefringent layers 65, 66 respectively of portions of the tree and house designs. These layers also preferably of cellulose "Scotch tape Cellophane" are oriented with their significant directions or axes as desired, for example, at 15° with the horizontal. Similarly the annular ring 51' is cut away in the regions overlying these layers 65, 66 to receive respective layers 67, 68 of similar birefringent material oriented, for example, respectively at 45° and 30° with the horizontal. If the design is to have only two layers as, for example that of the tree, the annular ring 52' is cut away over the layer 67 and nothing is filled into such cut-away portion. If the design has three layers, as for example that of the house, the ring 52' if oriented at other than 45° is cut away over the layer 68, and a layer of similar birefringent material 69 oriented, for example, at 45° is applied over the layer 68. The isotropic sheet 42' with such an arrangement is used together with the vectograph bearing sheet 35 in the same way as is the isotropic sheet 42. When so used, the observer positioned in front of the vectograph bearing sheet 35 will see alternate images 39, 40 fading in and out and simultaneously counterclockwise color flow and in addition novel color changes and effects in the designs of the house and tree. In either event reversal of direction of rotation of sheet 19 will reverse direction of color flow.

It is to be understood that an infinite number of combinations of color flow and change of color in designs of all conceivable types may be secured by arranging birefringent material on isotropic sheets like sheet 42 in the areas thereof other than those coextensive with the vectograph or vectographs according to the principles described in the aforementioned Patent No. 2,393,968. The examples herein given, therefore, of color flow and design combinations are illustrative only and are in no sense to be regarded as limitations.

Likewise, while a specific way of varying the polarized light transmitted through the birefringent material bearing sheets 42 or 42' and the vectograph bearing polarizing sheet 35 has been described, other convenient means for transmitting polarized light of changing or of different polarities therethrough could be employed.

It is to be distinctly understood, therefore, that the embodiments of the invention shown and described are by way of example only. Variation in structural details are possible and are contemplated within the scope of the claim. There is no intention of limitation to the exact details shown and described.

What is claimed is:

In combination a substantially circular sheet of substantially isotropic translucent material, a coextensive sheet of polarizing material having a concentrically arranged aperture attached thereto, a contrast vectograph secured in said aperture and birefringent material secured and positioned between said two sheets, said birefringent material being arranged in ring-like form about said aperture and consisting of contiguous segments of such birefringent material whose optical orientations are successively at greater angles with a predetermined direction.

FFORD BURCHELL.

REFERENCES CITED

The following references are of record in the file of this patent:

UNITED STATES PATENTS

| Number | Name | Date |
| --- | --- | --- |
| 2,165,974 | Land | July 11, 1939 |
| 2,169,022 | Chubb | Aug. 8, 1939 |
| 2,261,957 | Burchell | Nov. 11, 1941 |
| 2,393,968 | Burchell et al. | Feb. 5, 1946 |
| 2,393,970 | Burchell et al. | Feb. 5, 1946 |